Jan. 28, 1964     C. J. STIEFEL ETAL     3,119,532
CLOSURE DEVICE FOR FLAT BOTTOM VEHICLES
Filed Oct. 3, 1960
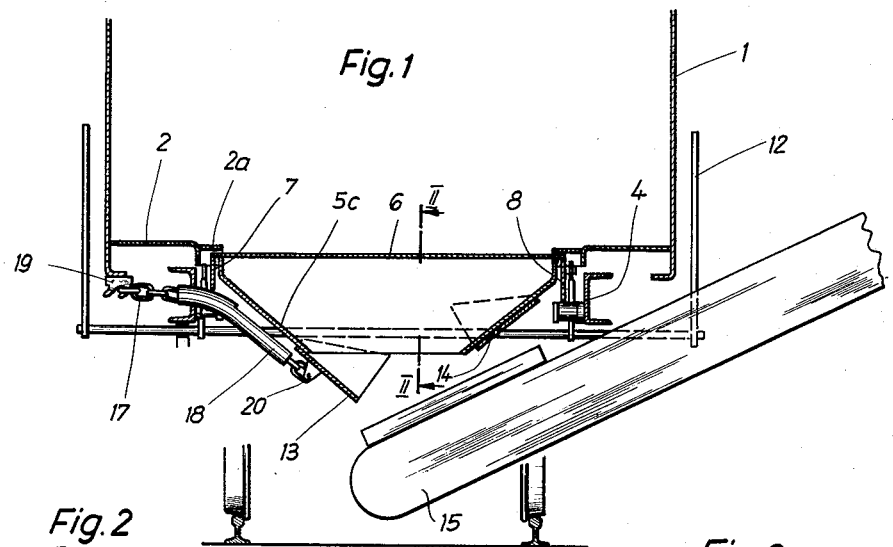
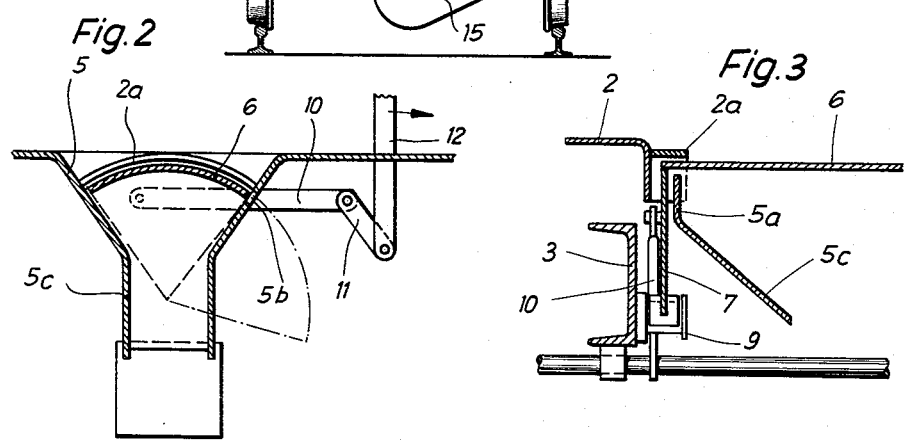
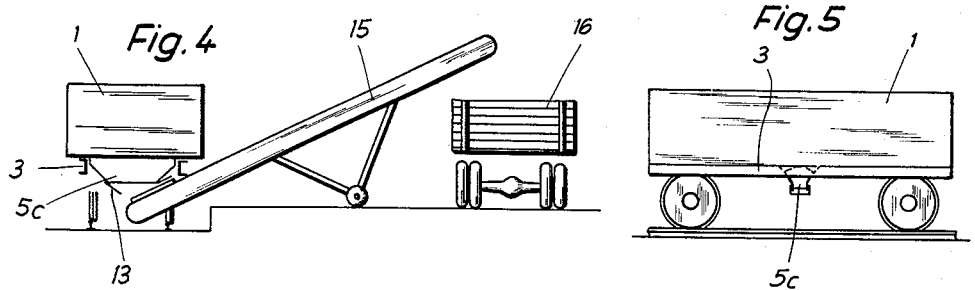
INVENTOR.
BY

United States Patent Office 3,119,532
Patented Jan. 28, 1964

3,119,532
CLOSURE DEVICE FOR FLAT BOTTOM
VEHICLES
Christian J. Stiefel, Aachen, and Helmut F. König,
Minden, Westphalia, Germany, assignors to Waggon-
fabrik Talbot, Aachen, Germany
Filed Oct. 3, 1960, Ser. No. 60,127
Claims priority, application Germany Oct. 7, 1959
3 Claims. (Cl. 222—508)

The present invention relates to a closure device for vehicles with a flat bottom, especially open freight cars.

In order to improve the discharge of bulk materials from open freight cars, frequently slides or flaps are built into the flat car bottom. Such arrangements, however, have the drawback that the discharge flow of the bulk materials cannot be controlled in such a way as to assure a steady direct discharge of the bulk material from the freight car onto a conveyor or the like.

It is, therefore, an object of the present invention to provide a closure device for flat bottom cars, especially open freight cars, which will overcome the above mentioned drawback.

It is another object of this invention to provide a closure device as set forth in the preceding paragraph, which will make it possible easily to control the discharge of bulk goods from flat bottom cars onto conveyor means or the like.

These and other objects and advantages of the invention will appear more clearly from the following specification in connection with the accompanying drawing, in which:

FIG. 1 represents a diagrammatic longitudinal section through a closure device according to the invention, the displacing means for the mouthpiece, spout or funnel being shown on one side only.

FIG. 2 is a cross section through FIG. 1 taken along the line II—II thereof.

FIG. 3 illustrates the mounting of the round slide forming part of the closure device.

FIG. 4 diagrammatically illustrates the arrangement of a conveyor belt below the closure device according to the invention.

FIGURE 5 is a side view of a freight car of the type shown in section in FIG. 1.

The above mentioned objects have been realized according to the present invention by arranging an adjustable round slide in a trough transverse between the longitudinal beams of the car. By means of such a round slide it is possible to control the discharge flow of the bulk material in such a way that a steady discharge can be effected onto a conveyor belt.

According to an embodiment which has proved particularly advantageous in practice, a funnel-shaped chute may be arranged within the curved slide. The side walls of the curved slide may in this connection be journalled outside the chute on the longitudinal beams of the car so that the journalling of the curved slide will not impede the outflowing bulk material. Furthermore, there is provided a bottom plate which will cover up the space between the longitudinal beams and the side walls of the slide as well as between the chute and said side walls.

In order to be able to vary the discharge opening of the chute, the latter has at its exit portion provided spouts, mouthpieces or the like which are displaceable by means of chain pulls movable in pipes and secured in locking means or the like on the outside of the car.

More specifically, with reference to the drawing, FIG. 1 shows a freight car provided with a flat bottom 2. In order to obtain a good discharge of bulk materials, there is provided transverse between the longitudinal car beams 3 and 4 a trough 5 which is adapted to be closed by a round slide 6. The slide 6 is so arranged that when the slide occupies its closing position its upper vertex or zenith line is located approximately at the level of the flat bottom 2 so as to form a part of the car bottom. Adjacent the trough 5 there is provided a chute 5c. Slide 6 has two side walls 7 and 8 which by means of studs or pivots 9 are journalled on the longitudinal beams 3 and 4 respectively (FIG. 3 showing the journalling on beam 3 only). The inclined walls 5c of chute 5 cover up the studs 9 so that the latter will not impede the discharge of the bulk material. As will be seen from the drawing, trough 5 is so designed that its end faces 5a are located within the slide 6, a slot 5b being provided in one side wall of the trough to allow passage of slide 6 therethrough. Slide 6 has connected thereto a lever system 10 and 11 and a manually operable lever 12 adapted to be shifted in the direction of the arrow and back for opening and closing slide 6.

As will be evident from FIG. 3, the bottom plate 2a covers up the space between the longitudinal beam 3 and the slide wall 7 and also the space between trough portion 5a and slide wall 7.

At the exit of chute 5c there may be provided displaceable mouthpieces or spouts 13 and 14 so that the discharge opening may be adapted for instance to the width of a conveyor belt 15 placed below the car 1. In conformity with FIG. 4, said conveyor belt 15 may, for instance, convey the bulk material from the discharge opening of car 1 to a truck 16 or the like. The mouthpieces 13 and 14 may be displaceable in any convenient manner, for instance, by chain pulls 17. The chain pulls 17 are guided in pipes 18 and may be held in their respective adjusted position in locks 19 arranged outside the slide walls 7 and 8 and connected to the car 1. The mouthpieces 13, 14 have connected thereto small supports or the like 20 to which the chain pulls 17 are linked. In order to permit a displacement of the mouthpieces 13 and 14, the pipes are cut open on that side thereof which faces the mouthpieces.

It is, of course, to be understood that the present invention is, by no means, limited to the particular construction shown in the drawing but also comprises any modifications within the scope of the appended claims.

What we claim is:

1. A closure arrangement for a flat bottom car having longitudinally extending beams spaced from each other in transverse direction of the car, which includes: a trough having an opening at its bottom portion and extending in transverse direction of said car between said beams, said trough having an open upper end and walls tapering inwardly from said open upper end downwardly to the said bottom portion, adjustable chute means supported by said trough and adjacent to the opening at the bottom portion thereof to thereby vary the effective discharge opening of said trough, control means connected to said adjustable chute means and operable from the outside of said car for actuating said adjustable chute means, said control means comprising tubular means below said trough, pull chain means extending slidably through said tubular means and connected at one end to said chute means, and locking means mounted on said car for locking said pull chain means at the other end thereof in the respective adjusted positions thereof, one laterally extending wall and the end walls of said trough being provided with a slit-like opening, an arcuate slide movable through said slit-like opening for opening and closing the trough, end members on the slide outside the trough, and means pivotally connecting said end members to said beams on an axis which coincides with the center of curvature of said slide.

2. In a freight car; a flat bottom, laterally spaced longitudinally extending beams beneath said bottom, a discharge opening in said bottom in the central portion thereof located between said beams and extending in a direction transverse to the longitudinal direction of the freight car, a funnel shaped trough having front, back, and side walls and tapering inwardly on all sides toward the bottom and having its front and back walls connected at the top to the front and back edges, respectively, of said discharge opening, a slide for closing and opening said opening and comprising a portion of a cylinder concave downwardly and having its axis extending transversely of the freight car, slot means in one of the front and back walls of said trough through which said slide is movable in opening and closing said discharge opening, the ends of said slide projecting beyond the side walls of said trough, end walls depending from the ends of said slide and positioned outside the side walls of said trough and extending to adjacent the sides of said beams, and relatively short pivot means on the said axis of said slide and pivotally interconnecting said side walls to said beams for tilting movement of the said slide in the opening and closing directions thereof, the center of said slide in the closed position of the slide being substantially co-planar with the bottom of the car.

3. The structure according to claim 2 in which arcuate plates are provided on the inside of the side walls of the said trough extending inwardly in overlying relation with the said ends of said slide.

References Cited in the file of this patent

UNITED STATES PATENTS

| | | |
|---|---|---|
| 998,393 | Reeder | July 18, 1911 |
| 1,066,978 | Babbitt | July 8, 1913 |
| 1,256,515 | Brown | Feb. 19, 1918 |
| 1,408,984 | Carlquist | Mar. 7, 1922 |
| 1,667,959 | Talbot et al. | May 1, 1928 |
| 1,907,773 | Fisher et al. | May 9, 1933 |
| 2,337,817 | Hertrich | Dec. 28, 1943 |
| 2,605,940 | Doyle | Aug. 5, 1952 |